(No Model.)
H. A. CLARK.
ELECTRIC CABLE.
No. 311,174. Patented Jan. 27, 1885.
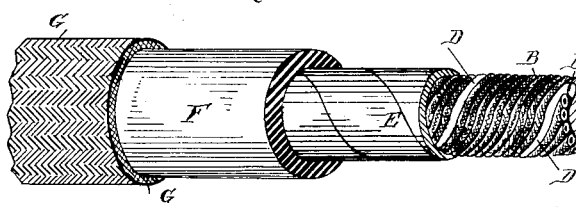
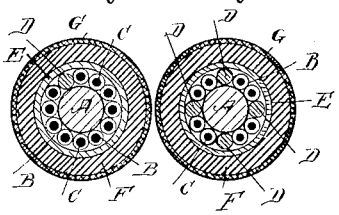
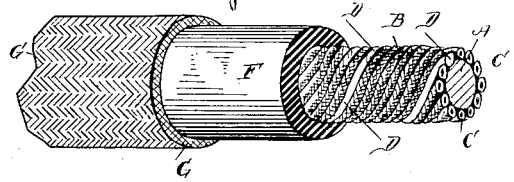
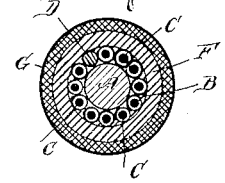
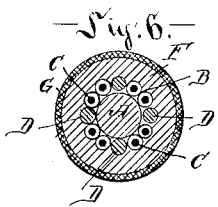
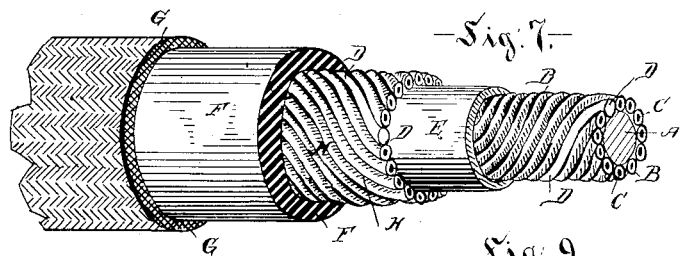
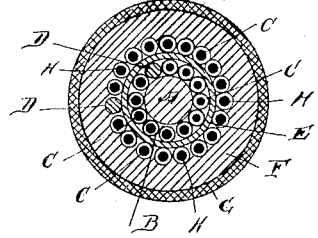
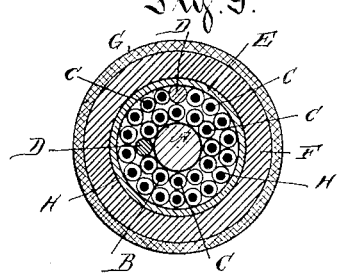
Witnesses
Wm. S. Bellows
H. M. Coney
Henry A. Clark
Inventor
per Brown Bros.
Attorneys

UNITED STATES PATENT OFFICE.

HENRY A. CLARK, OF BOSTON, MASSACHUSETTS.

ELECTRIC CABLE.

SPECIFICATION forming part of Letters Patent No. 311,174, dated January 27, 1885.

Application filed April 24, 1884. (No model.)

*To all whom it may concern:*

Be it known that I, HENRY A. CLARK, of Boston, in the county of Suffolk and State of Massachusetts, have invented certain new and useful Improvements in Electric Cables, of which the following is a full, clear, and exact description.

This invention relates to a cable for telephonic, telegraphic, and electric purposes, and to the construction and arrangement of such a cable that its electric conducting-wires will be suitably insulated, and in its use induction and leakage overcome; and the invention consists of a wire or wires of iron, copper, or of any suitable electric conducting material surrounded by a series or layer of electric conducting-wires, one or more of which wires are bare wires and the others insulated wires, which series or layer of insulated wires and bare wires are covered with an electric conducting material which in turn is covered with any suitable insulating material and with or without an outside covering of any suitable protecting material, all substantially as hereafter fully described.

It also consists of a wire or wires of iron, copper, or of any suitable electric conducting material surrounded by a series or layer of electric conducting-wires one or more of which wires are bare wires and the others insulated wires, which wires are covered with any suitable insulating material and with or without an outside covering of any suitable protecting material, all substantially as hereinafter fully described.

It also consists of a wire or wires of iron, copper, or of any suitable electric conducting material surrounded by a series or layer of electric conducting-wires, one or more of which wires are bare wires and the others insulated wires, which series or layer of insulated wires and bare wires are covered with an electric conducting material, which in turn is covered with another similar series or layer of insulated and bare wires, and then covered with any suitable insulating material and with or without an outside covering of any suitable protecting material, all substantially as hereinafter fully described.

It also consists of a wire or wires of iron, copper, or any suitable electric conducting material surrounded by a series or layer of electric conducting-wires, one or more of which wires are bare wires and the others insulated wires, which series or layer of insulated wires and bare wires are covered with another similar series or layer of insulated wires and bare wires, and then covered with an electric conducting material, in turn covered with any suitable insulating material and with or without an outside covering of any suitable protecting material, all substantially as hereinafter fully described.

In the accompanying plate of drawings is illustrated an electric cable constructed according to this invention, Figures 1, 4, and 7 representing such an electric cable in side view, with its several layers and coverings exposed to view. Fig. 2 is a cross-section of Fig. 1. Fig. 5 is a cross-section similar to Fig. 2, but showing a modification. Fig. 6 is a cross-section similar to Fig. 5, but showing a modification. Fig. 8 is a cross-section of Fig. 7; and Fig. 9 is a cross-section similar to Fig. 8, but showing a modification.

In the drawings, A represents a center wire, of iron, copper, or of any suitable electric conducting material; and B, a series or layer of electric conducting-wires composed of insulated wires C and a bare wire, D, the insulated wires being insulated, in any suitable manner, separately and independently of each other. As shown in Figs. 1 and 2, these insulated wires C and the bare wire D are spirally wound around the center wire, A, and are of a number and size to closely surround the wire A, as shown. Over this layer of insulated wires C and bare wire D is wound, preferably in spiral form, a strip or sheet, E, of metal, preferably of tin-foil, and over this tin-foil is a coating or covering, F, of any suitable insulating material—such as india-rubber or gutta-percha, each either alone or combined with each other or in any of their compounds—and over this insulated material is a covering, G, of cotton or other suitable fibrous material, braided or woven or wound thereon, or in any suitable manner.

In Fig. 3 is shown in cross-section a cable constructed like Figs. 1 and 2, but having in lieu of one bare wire D four bare wires D.

In Figs. 4 and 5 is shown a cable constructed like that shown in Figs. 1 and 2, except that the covering E, of tin-foil, is dispensed with, and the insulated material F covered directly onto the layer B of insulated wires and bare wire.

In Fig. 6 is shown in cross-section a cable constructed like that shown in Figs. 4 and 5, but having four bare wires in lieu of one.

In Figs. 7 and 8 is shown a cable having a center wire, A, surrounded by the series B of insulated wires and bare wire covered with tin-foil E, which in turn is surrounded by another series or layer, H, of insulated wires C and a bare wire, D, but in a spiral direction opposite to the series B, this second series, H, being covered with the insulating material F and braid G, as before.

In Fig. 9 is shown in cross-section an electric cable similar to that shown in Figs. 7 and 8, but with the second series or layer, H, of insulated wires and bare wire wound directly upon the series B, and having the electric conducting material E, over the series H, in turn covered with the insulating material F and outside protecting-braid, G.

The several wires C can be insulated in any suitable manner, and with any suitable insulating material; also, in lieu of tin-foil a sheet or strip of any suitable electric conducting material can be used, and it can be applied in any suitable manner; also, the insulating material F can be of any suitable insulating material; also, the braided covering can be of any suitable material, and applied thereto by braiding it thereon, as shown, or by weaving it or winding it thereon, or otherwise, and the center wire can be one or more wires of suitable electric conducting material.

Either the center wire or the bare wire or the tin-foil, or all can be connected, when using the cable, to the ground by any suitable electric conducting material to obviate induction and leakage.

The advantage of having one or more bare wires with the insulated wires, as shown, is that, if desired to connect the center wire, A, with the ground at any particular place, except at its end, the bare wire itself or the tin-foil can be connected by a suitable electric conducting-wire to the ground, and as the bare wire is always in contact with the center wire and the tin-foil in contact with the bare wire, the grounding of the cable for the better prevention of induction and leakage will be insured, and that without disturbing the insulated wires.

It is preferable and necessary to have the foil in close contact with the bare wire or wires, and the bare wire or wires in close contact with the center wire, to insure electrical connection between the three; also, one or more bare wires can be used, although probably one bare wire will be sufficient for general purposes; also, the wires insulated as well as bare can be laid spirally, as shown, or longitudinally, or as desired.

Having thus described my invention, what I claim is—

1. An electric conducting-cable composed of a center electric conducting wire or wires surrounded by a series or layer of electric conducting wires, one or more of which wires are bare wires and the rest insulated wires, which are covered with an electric conducting material and an outside protecting-covering, substantially as and for the purpose specified.

2. An electric conducting-cable composed of a center electric conducting wire or wires surrounded by a series or layer of electric conducting wires, one or more of which wires are bare wires and the rest insulated wires, said series or layer being covered with an electric conducting material, which is covered with an insulating-material and with an outside protecting-covering, substantially as and for the purpose specified.

3. An electric conducting-cable composed of a center electric conducting wire or wires surrounded by a series or layer of electric conducting-wires, one or more of which wires are bare wires and the rest insulated wires, said series or layer being covered with an electric conducting material, which is surrounded by another series or layer of insulated wires and one or more bare wires, said second series or layer being covered with an electric conducting material covered with an insulating-material and with an outside protecting-covering, substantially as and for the purpose specified.

4. An electric conducting-cable composed of a center electric conducting wire or wires, surrounded by a series or layer of electric conducting-wires, one or more of which wires are bare wires and the rest insulated wires, in turn covered with a second series or layer of insulated wires and bare wire or wires, said second series or layer being covered with an electric conducting material which is covered with an insulating material and with an outside protecting-covering, substantially as and for the purpose specified.

In testimony whereof I have hereunto set my hand in the presence of two subscribing witnesses.

HENRY A. CLARK.

Witnesses:
 EDWIN W. BROWN,
 WM. S. BELLOWS.